May 25, 1937.  E. N. ROBERTS  2,081,884
RECOVERY OF SOLVENTS FROM OIL
Filed Aug. 16, 1934
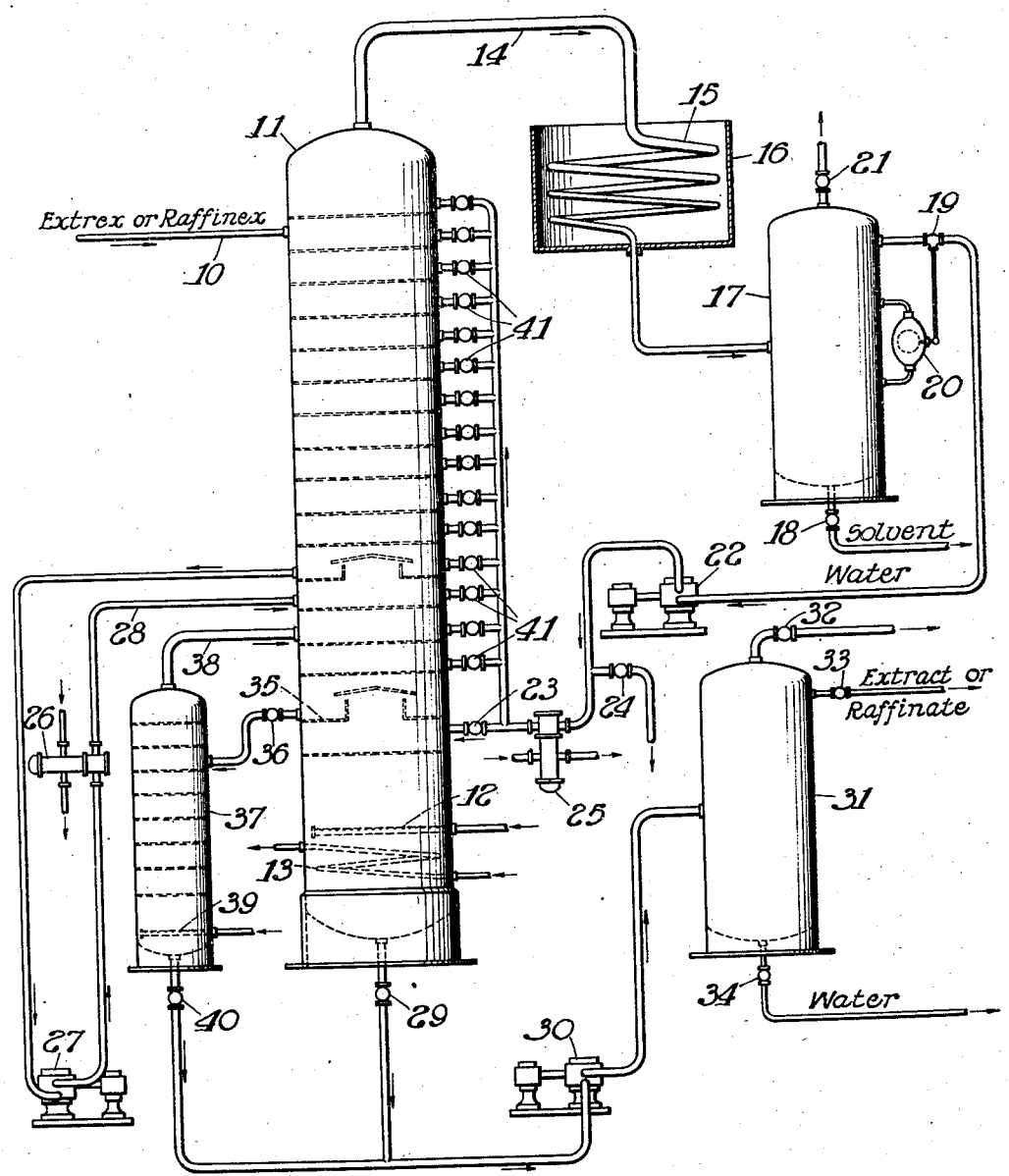
INVENTOR
*Edward N. Roberts*
BY
ATTORNEY Patented May 25, 1937

2,081,884

UNITED STATES PATENT OFFICE 2,081,884

RECOVERY OF SOLVENTS FROM OIL

Edward N. Roberts, Casper, Wyo., assignor to Standard Oil Company, Chicago, Ill., a corporation of Indiana Application August 16, 1934, Serial No. 740,078

2 Claims. (Cl. 202—42)

This invention relates to the recovery of solvents from oils. More particularly, it relates to the recovery of solvents from intermediate products of processes such as solvent extraction, solvent dewaxing, etc. of vegetable, animal and mineral oils, especially the latter. Still more particularly, it relates to the recovery of beta beta' dichlor diethyl ether ("Chlorex") from mineral oils, especially mineral lubricating oils.

It is an object of my invention to provide a process for the recovery of solvents from oils with maximum efficiency and with minimum loss of solvent. Another object is to provide a process of this type which will provide for a high degree of economy, particularly as to the utilization of heat. Still another object is to provide a process of this type which will avoid, insofar as possible, any injury to either the oil or the solvent. In particular, it is an object to provide such a process in which decomposition of the solvent is avoided. Still further objects of my invention will become apparent as the description thereof proceeds.

Processes for the treatment of various types of oils, such as animal, vegetable and mineral oils, with solvents have recently come into considerable favor. Typical examples of such processes are processes for the removal of wax from mineral lubricating oils by treatment with solvents and processes for separating mineral oils or mineral oil fractions into two or more components on the basis of the selective solvent power of various solvents. Processes of this latter type have been used or proposed for the treatment of motor fuel stocks, burning oil stocks and particularly lubricating oil stocks. Thus, for instance, a lubricating oil stock can be treated with such solvents as "Chlorex", cresylic acid, phenol, furfural, pyridine, nitrobenzene, etc. under temperature conditions such as to form at least two liquid phases, one containing, as a rule, the greater amount of solvent and the more soluble portion of the oil (this phase being known as the extrex) and the other containing, as a rule, a lesser amount of the solvent together with the less soluble portion of the oil (this phase being known as the raffinex). When the solvent is removed from the extrex and raffinex the oil constituents contained therein are known, respectively, as the extract and the raffinate. My invention relates in particular to the removal of the solvent from either or both of these two phases and will be described in conjunction therewith, although it will be understood that similar processes can be used for the removal of solvents from other materials regardless of the source thereof. My process is particularly applicable to recovery of solvents which at normal operating temperatures are relatively insoluble but not completely insoluble in water or other stripping medium to be used.

The details of my invention will become apparent from the hereinafter contained description with particular reference to the drawing which represents a conventionalized diagram of one embodiment of my process.

Referring now more particularly to the drawing, a mixture of solvent and oil, for instance an extrex or raffinex, is introduced through line 10, from a source not shown, into fractionating tower 11 which may suitably be a bubble tower of the well known type. This stock may advantageously be preheated before introducing into the tower which may conveniently be done by passing it through a heat exchanger in indirect heat exchange relation with a hot tar, steam or other heating fluid or by means of a pipe heater. In this case it is desirable to introduce the heat into the stock as rapidly as practicable and transfer it to the tower 11 as soon as possible in order to minimize decomposition of the solvent and oil. The material is preferably introduced near the top of tower 11. At the bottom of tower 11 heat is supplied by means of a vaporized stripping medium, usually steam, introduced through open coil 12. Additional heat can be supplied, if needed, by means of a closed heating coil 13. The liquid mixture of solvent and oil passes downward in column 11 and comes in contact with the rising vapors of stripping medium, hereinafter referred to as steam.

The steam tends to remove the solvent by the process of steam distillation, and solvent and steam pass off from the top of the tower through line 14 to condenser 15 enclosed in condenser box 16 and thence to separator 17. In general, the solvent will have a higher specific gravity than the condensed stripping medium (water) and will therefore be removed from the bottom of separator 17, through valve 18 for storage or reuse. If desired this solvent can be thereafter flash-distilled or otherwise treated to remove any water contained in it. The upper layer in separator 17 is water containing some dissolved solvent and is removed from the upper portion of separator 17 through valve 19, which may suitably be controlled by a float control 20 so as to make the operation of separator 17 automatic. Separator 17 may also suitably be provided with vent valve 21 for the removal of fixed gases. The water withdrawn through valve 19 is pumped by means of pump 22 through valve 23 into tower 11.

In some cases, such as when beginning the operation of the apparatus, it may be desirable to withdraw water saturated with solvent through valve 24 to a suitable storage and, conversely, when the apparatus has been properly adjusted and is in regular operation, water containing solvent may be introduced by valve 24 to heat exchanger 25 and thence into the solvent recovery system. Additional heat can be supplied to the tower at the point of introduction of the recycled water by means of heat exchanger 25 which can suitably be supplied with heat by means of one of the hot streams from the solvent extraction process or by waste steam, etc. Heat can also be supplied to the tower at any desired intermediate level by means of a heating coil submerged within the liquid on one of the plates of tower 11 or by means of external heater 26 through which a portion of the condensate from one of the trays of the tower is pumped by means of pump 27 and from which the heated material is returned to the tower through line 28.

I prefer to introduce the recycled material into the tower at a point substantially above heating coils 12 and 13. Not only is it desirable to introduce the recycled stock above the heating coils in order not to interfere with the equilibrium in the tower as before mentioned but this procedure also tends to minimize the temperature to which the solvent retained in the recycled water is subjected. This is important since with many of the solvents on which my process can be used chemical reactions occur at elevated temperatures which tend to destroy a portion of the solvent. Thus, in the case of "Chlorex", (beta beta' dichlor diethyl ether) to which my process is particularly adapted, a reaction occurs between the "Chlorex" and water at elevated temperatures whereby a portion of the "Chlorex" is hydrolyzed and lost. This hydrolysis is accompanied by corrosion problems since hydrochloric acid is formed. Nevertheless, it is possible to inject the recycled material from separator 17 into the base of tower 11 or into all or a portion of the steam entering tower 11 through line 12.

In general, the heat introduced to my process, whether through coils 12 and/or 13 or heaters 25 and/or 26, can suitably be waste heat from streams of relatively low temperature oil or oil solution from the solvent extraction process, or it can be so-called "process steam", i. e., steam which has already been used for other purposes requiring higher temperatures. In order to make possible the use of this inexpensive low temperature heat and in order to avoid decomposition of the solvent, it is desirable to operate tower 11 at relatively low pressures, preferably not substantially in excess of atmospheric. With high boiling point solvents it may be necessary to use superheated steam and with such solvents I may also employ a reduced pressure below atmospheric pressure in order to produce the temperature necessary to remove the solvent from the oil.

The material in the bottom of tower 11 is substantially free from solvent and consists of oil (extract or raffinate) and water. This mixture is removed through valve 29 by means of pump 30 to separator 31, equipped with vent valve 32, and the oil and stripping medium (water) are separately removed through valves 33 and 34, respectively.

Instead of removing water and oil together through valve 29 at the bottom of tower 11 I can trap out the oil at plate 35 by means of valve 36 leading to side stripper 37. Steam, which can be superheated if desired, is introduced into the base of side stripper 37 by means of line 39, thus expelling any solvent from the oil and carrying it back to the tower 11 by vapor line 38. Oil stripped in this manner is led through valve 40 to pump 30 and thence to separator 31, as hereinbefore described.

Operating in this manner the removal of solvent from water introduced by valve 23 into the base of tower 11 is somewhat facilitated and the oil phase may be stripped separately in stripper 37 to a higher temperature than the boiling point of water under the conditions present. When operating with side stripper 37, open steam coil 12 can be dispensed with and sufficient heat can be supplied by closed heating coil 13 to drive off all the solvent from the water introduced by valve 23.

Instead of introducing water and dissolved solvent by means of valve 23, I can close valve 23 and introduce water and dissolved solvent to the tower by means of any one or more of the valves 41. The point at which the recycled water and dissolved solvent are introduced should be determined in each individual case and can be varied within broad limits. In general, the point of introduction should be such that the relative proportions of solvent and water in the recycled material will be approximately the same as the relative proportions of solvent and water otherwise existing at that point in the tower. In other words, the injected material should be introduced at such a level as not to displace the equilibrium otherwise existing in stripping tower 11. Similarly, the temperature of the material being injected may suitably correspond to the temperature of the material otherwise existing at that point of the tower. When operating in this alternative manner the oil and water-solvent solution are simultaneously stripped of their solvent content and may flow downward through the tower in a simple manner and pass out through valve 29. In this case the amount of solvent remaining in both the oil and water is progressively reduced on each plate of the tower. In general it is preferred to introduce the extrex or raffinex at a temperature above the boiling point of water in order to remove therefrom the major quantity of solvent contained in the oil in the upper plates of the tower. The lower plates of the tower then serve to provide complete stripping and recovery of the solvent from the oil and the water-solvent solution which is introduced at an intermediate point; thus the maximum stripping effect of the stream which is introduced by line 12 is obtained.

While I have described my invention in connection with certain specific embodiments thereof it is to be understood that I do not wish to be limited thereby but only to the scope of the appended claims:

I claim:

1. A process for the recovery of solvent and oil from a solution of said oil in said solvent, said solvent being relatively insoluble but not completely insoluble in water in the liquid phase under normal operating conditions, said process comprising introducing said solution into a stripping tower at an elevated level, introducing steam into the bottom of said stripping tower to strip said oil and said solvent from the material in said tower, removing a vapor mixture of solvent and water from the top of said tower, condensing said mixture, separating the condensed mixture into a predominantly solvent phase and a predominantly aqueous phase, recycling said predominantly aqueous phase to said tower at a point substantially above the bottom of said tower, withdrawing a stream consisting of solvent, oil and water from said tower at a point above said last mentioned point and below the point of introduction of said solution, passing said stream to a separate auxiliary stripping zone, stripping solvent from the oil in said stripping zone, with steam, removing oil from said stripping zone, reintroducing solvent and water vapors from said stripping zone into said tower above the point of withdrawal and below the point of introduction of said solution, and removing water from substantially the bottom of said tower.

2. The process of separating mineral oil and organic solvent dissolved therein, said solvent being partly soluble in water, comprising stripping said solvent from said oil with a current of solvent vapors and steam in a first stripping zone, withdrawing said oil from said stripping zone, separately withdrawing solvent vapors together with steam from said stripping zone, condensing the withdrawn solvent vapors and steam, separating the condensed solvent from the condensed water containing solvent dissolved therein, stripping said dissolved solvent from said condensed water with a current of steam out of contact with oil in a second stripping zone separate and distinct from said first stripping zone, and passing the resulting solvent vapors and steam from said second stripping zone into contact with the oil and solvent in said first stripping zone to act as stripping medium therein.

EDWARD N. ROBERTS.